(12) United States Patent
Matsubara et al.

(10) Patent No.: US 11,165,316 B2
(45) Date of Patent: Nov. 2, 2021

(54) METHOD FOR MANUFACTURING A ROTOR AND DEVICE FOR MANUFACTURING A ROTOR

(71) Applicant: AISIN AW CO., LTD., Anjo (JP)

(72) Inventors: Tetsuya Matsubara, Anjo (JP); Motoki Kori, Anjo (JP); Akira Takasu, Anjo (JP); Takamasa Kondo, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 76 days.

(21) Appl. No.: 16/625,302

(22) PCT Filed: Aug. 21, 2018

(86) PCT No.: PCT/JP2018/030719
§ 371 (c)(1),
(2) Date: Dec. 20, 2019

(87) PCT Pub. No.: WO2019/039442
PCT Pub. Date: Feb. 28, 2019

(65) Prior Publication Data
US 2020/0161945 A1    May 21, 2020

(30) Foreign Application Priority Data
Aug. 21, 2017  (JP) .............................. JP2017-158332

(51) Int. Cl.
| H02K 15/02 | (2006.01) |
| H02K 15/03 | (2006.01) |
| H02K 1/27 | (2006.01) |
| H02K 1/28 | (2006.01) |
| H02K 15/12 | (2006.01) |

(52) U.S. Cl.
CPC .............. *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ......... Y10T 29/49012; Y10T 29/49009; Y10T 29/4902; H02K 15/0012; H02K 1/26; H02K 15/02
USPC .................. 29/598, 596, 604, 609, 732, 738
See application file for complete search history.

(56) References Cited

U.S. PATENT DOCUMENTS

| 11,050,328 | B2 * | 6/2021 | Ushida .................... H02K 15/03 |
| 2014/0077648 | A1 * | 3/2014 | Brauer ...................... H02K 3/26 |
| | | | 310/152 |

FOREIGN PATENT DOCUMENTS

| JP | 2007-151362 A | 6/2007 |
| JP | 2012-244838 A | 12/2012 |

OTHER PUBLICATIONS

Apr. 22, 2020 European Search Report issued in European Patent Application No. 18848797.9.

(Continued)

*Primary Examiner* — Thiem D Phan
(74) *Attorney, Agent, or Firm* — Oliff PLC

(57) ABSTRACT

A method for manufacturing a rotor including a rotor core and a permanent magnet, the rotor core having a magnet hole, and the permanent magnet being inserted in the magnet hole and fixed to the rotor core with an adhesive, including the steps of: applying the adhesive, inserting the permanent magnet into the magnet hole of the rotor core, volatilizing the diluting solvent, expanding the expanding agent, and fixing the permanent magnet to the rotor core.

19 Claims, 8 Drawing Sheets

(56) References Cited

OTHER PUBLICATIONS

Nov. 20, 2018 International Search Report issued in International Patent Application No. PCT/JP2018/030719.

* cited by examiner

METHOD FOR MANUFACTURING A ROTOR AND DEVICE FOR MANUFACTURING A ROTOR

BACKGROUND

The present disclosure relates to methods for manufacturing a rotor and devices for manufacturing a rotor.

Conventionally, methods for manufacturing a rotor are known in which permanent magnets are inserted into magnet holes of a rotor core. For example, Japanese Patent Application Publication No. 2007-151362 (JP 2007-151362 A) discloses such a method for manufacturing a rotor.

Japanese Patent Application Publication No. 2007-151362 (JP 2007-151362 A) discloses a method for fixing permanent magnets in which permanent magnets are inserted and accommodated in accommodating grooves of a rotor core. In this method for fixing permanent magnets, an adhesive containing a foaming agent that foams when heated is placed on the surface of a permanent magnet by dropping a melted adhesive onto the surface of the permanent magnet. The adhesive is then pressed by a press machine while being heated in order to cure the adhesive and reduce the thickness of the adhesive. Thereafter, the permanent magnet is inserted into an accommodating groove of a rotor core. The adhesive is then heated, whereby the foaming agent foams and the adhesive is expanded. The permanent magnet is thus fixed to the rotor core with the expanded adhesive.

SUMMARY

In such a conventional method for fixing permanent magnets as described in Japanese Patent Application Publication No. 2007-151362 (JP 2007-151362 A), the adhesive needs to be heated (increased in temperature) to a temperature equal to or higher than the curing temperature of the adhesive within a predetermined first time and the temperature of the heated adhesive needs to be kept constant (the heated adhesive needs to be keep at the temperature) for a predetermined second time or longer in order to obtain a predetermined expansion ratio and adhesive strength. The adhesive may contain a volatile solvent. In this case, the solvent is volatilized while the temperature of the adhesive is being increased. However, in the case where the temperature of the adhesive is rapidly increased in order to reduce the period for which the temperature of the adhesive is increased and thus reduce the time required to perform the bonding process, the foaming agent starts foaming with the unvolatilized solvent remaining in the adhesive. That is, the foaming agent starts foaming while the solvent is vaporizing (boiling). The foaming agent therefore foams while being pushed away by the vaporizing solvent (bubbling solvent). The adhesive is then cured. Accordingly, the cured adhesive has not only been expanded by the foaming agent but also been expanded (overexpanded) as the foaming agent was pushed away by the vaporizing solvent. The overexpanded adhesive thus has voids formed as a result of the solvent vaporizing while pushing away the foaming agent. The adhesive therefore has reduced density. This is disadvantageous in that the adhesive strength of the adhesive is reduced.

An exemplary aspect of the disclosure provides a method for manufacturing a rotor and a device for manufacturing a rotor which can prevent reduction in adhesive strength of an adhesive while reducing the time for which the temperature of the adhesive is increased and thus reducing the time required to perform a bonding process.

A method for manufacturing a rotor according to a first aspect of the present disclosure is a method for manufacturing a rotor including a rotor core and a permanent magnet, the rotor core having a magnet hole, and the permanent magnet being inserted in the magnet hole and fixed to the rotor core with an adhesive. The method includes the steps of: applying the adhesive, which contains a volatile diluting solvent serving as a volatile agent and an expanding agent that expands when heated to a temperature equal to or higher than an expansion start temperature, to the permanent magnet or the magnet hole; inserting the permanent magnet into the magnet hole of the rotor core; after the step of inserting the permanent magnet into the magnet hole, volatilizing the diluting solvent by heating the adhesive to a temperature in a temperature range equal to or higher than a vaporization start temperature at which the diluting solvent volatilizes and lower than the expansion start temperature and increasing the temperature of the adhesive at a rate lower than that at which the temperature of the adhesive is increased when the adhesive is heated from a heating start temperature to a temperature in the temperature range equal to or higher than the vaporization start temperature and lower than the expansion start temperature; after the step of volatilizing the diluting solvent, expanding the expanding agent by heating the adhesive to a temperature equal to or higher than the expansion start temperature; and after expanding the expanding agent, fixing the permanent magnet to the rotor core with the adhesive by curing the adhesive by heating the adhesive to a temperature equal to or higher than a curing temperature.

The method for manufacturing a rotor according to the first aspect of the present disclosure includes the step of, after the step of inserting the permanent magnet into the magnet hole, volatilizing the diluting solvent by heating the adhesive to a temperature in the temperature range equal to or higher than the vaporization start temperature at which the diluting solvent volatilizes and lower than the expansion start temperature and increasing the temperature of the adhesive at a rate lower than that at which the temperature of the adhesive is increased when the adhesive is heated from the heating start temperature to a temperature in the temperature range equal to or higher than the vaporization start temperature and lower than the expansion start temperature. Accordingly, even if the unvolatilized diluting solvent remains in the adhesive at the time the permanent magnet is inserted into the magnet hole, the diluting solvent remaining in the adhesive can be volatilized because the temperature of the adhesive is increased (kept) at a rate lower than that at which the temperature of the adhesive is increased when the adhesive is heated from the heating start temperature to a temperature in the temperature range equal to or higher than the vaporization start temperature and lower than the expansion start temperature. Since the adhesive is heated to (kept at) a temperature equal to or higher than the vaporization start temperature at which the diluting solvent volatilizes and lower than the expansion start temperature, the expanding agent is not expanded in the step of volatilizing the diluting solvent. As a result, in the step of expanding the expanding agent after the step of volatilizing the diluting solvent, the expanding agent can be expanded with no diluting solvent remaining in the adhesive. Overexpansion of the adhesive due to vaporization of the diluting agent can thus be restrained even if the temperature of the adhesive is rapidly increased to a temperature equal to or higher than the expansion start temperature after the adhesive is kept at a temperature equal to or higher than the vaporization start temperature and lower than the expansion start temperature. Accordingly, reduction in adhesive strength of the adhesive can be prevented while reducing the time for which the temperature of the adhesive is increased and thus reducing the time required to perform the bonding process.

A device for manufacturing a rotor according to a second aspect of the present disclosure is a device for manufacturing a rotor including a rotor core and a permanent magnet, the rotor core having a magnet hole, and the permanent magnet being inserted in the magnet hole and fixed to the rotor core with an adhesive. The device includes: an applicator that applies the adhesive, which contains a volatile diluting solvent serving as a volatile agent and an expanding agent that expands when heated to a temperature equal to or higher than an expansion start temperature, to the permanent magnet or the magnet hole; and a heater that heats the adhesive. The heater is configured such that, after the permanent magnet is inserted into the magnet hole of the rotor core, the heater volatilizes the diluting solvent by heating the adhesive to a temperature in a temperature range equal to or higher than a vaporization start temperature at which the diluting solvent volatilizes and lower than the expansion start temperature and increasing the temperature of the adhesive with power lower than that with which the heater heats the adhesive from a heating start temperature to a temperature in the temperature range equal to or higher than the vaporization start temperature and lower than the expansion start temperature. After the diluting solvent is volatilized, the heater heats the adhesive to a temperature equal to or higher than the expansion start temperature to expand the expanding agent. After the expanding agent is expanded, the heater heats the adhesive to a temperature equal to or higher than a curing temperature to cure the adhesive, thereby fixing the permanent magnet to the rotor core with the adhesive.

In the device for manufacturing a rotor according to the second aspect of the present disclosure, after the permanent magnet is inserted into the magnet hole, the diluting solvent is volatilized by heating the adhesive to a temperature in the temperature range equal to or higher than the vaporization start temperature at which the diluting solvent volatilizes and lower than the expansion start temperature and increasing the temperature of the adhesive with power lower than that with which the adhesive is heated from the heating start temperature to a temperature in the temperature range equal to or higher than the vaporization start temperature and lower than the expansion start temperature. Accordingly, even if the unvolatilized diluting solvent remains in the adhesive at the time the permanent magnet is inserted into the magnet hole, the diluting solvent remaining in the adhesive can be volatilized because the temperature of the adhesive is increased (kept) at a rate lower than that at which the temperature of the adhesive is increased when the adhesive is heated from the heating start temperature to a temperature in the temperature range equal to or higher than the vaporization start temperature and lower than the expansion start temperature. Since the adhesive is heated to (kept at) a temperature equal to or higher than the vaporization start temperature at which the diluting solvent volatilizes and lower than the expansion start temperature, the expanding agent is not expanded in the step of volatilizing the diluting solvent. As a result, in the step of expanding the expanding agent after the step of volatilizing the diluting solvent, the expanding agent can be expanded with no diluting solvent remaining in the adhesive. Overexpansion of the adhesive due to vaporization of the diluting agent can thus be restrained even if the temperature of the adhesive is rapidly increased to a temperature equal to or higher than the expansion start temperature after the adhesive is kept at a temperature equal to or higher than the vaporization start temperature and lower than the expansion start temperature. Accordingly, a device for manufacturing a rotor can be provided which can prevent reduction in adhesive strength of the adhesive while reducing the time for which the temperature of the adhesive is increased and thus reducing the time required to perform the bonding process.

According to the present disclosure, as described above, reduction in adhesive strength of an adhesive can be prevented while reducing the time for which the temperature of the adhesive is increased and thus reducing the time required to perform the bonding process

DETAILED DESCRIPTION OF EMBODIMENTS

An embodiment of the present disclosure will be described with reference to the accompanying drawings.

[Structure of Rotor of Embodiment]

The structure of a rotor 100 according to the embodiment will be described with reference to FIGS. 1 to 15.

In the specification, the term "rotating electrical machine" is used as a concept including all of a motor (electric motor), a generator (electric generator), and a motor-generator that functions as either a motor or a generator as necessary. For example, a rotating electrical machine 101 is configured as a traction motor that is used in hybrid vehicles or electric vehicles.

Figure 1:
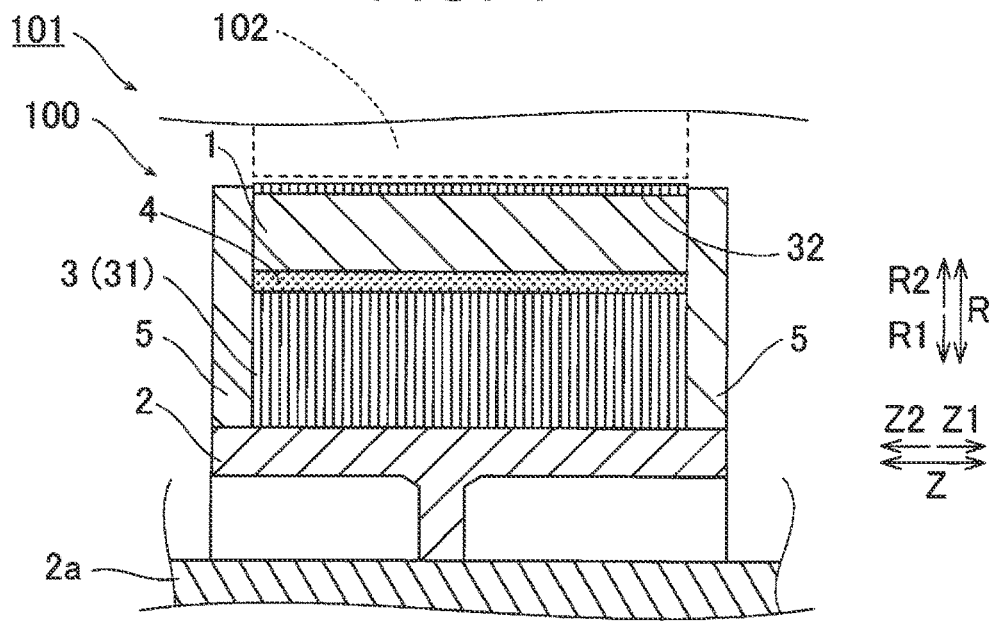
FIG. 1 is a sectional view of a rotating electrical machine (rotor) according to an embodiment.

In the specification, the "rotor rotation axis direction" or "axial direction" means the direction of the rotation axis of the rotor 100 (the direction along an axis C1 (see FIG. 2); the direction parallel to the Z-axis in FIG. 1). The "circumferential direction" means the circumferential direction of the rotor 100 (the direction of arrow A1 or the direction of arrow A2 in FIG. 2). The "radial direction" means the radial direction of the rotor 100 (the direction of arrow R1 or the direction of arrow R2 in FIG. 1). The expression "radially inside," "radially inner side," "radially inner," or "radially inward" means the radially inner side (the side in the direction of arrow R1) of the rotor 100, and the expression "radially outside," "radially outer side," "radially outer," or "radially outward" means the radially outer side (the side in the direction of arrow R2) of the rotor 100.

(General Structure of Rotor)

As shown in FIG. 1, the rotor 100 forms, e.g., a part of an interior permanent magnet motor (IPM motor) having a plurality of permanent magnets 1 embedded in the rotor 100 (a part of the rotating electrical machine 101).

The rotor 100 is disposed radially inside a stator 102 so as to face the stator 102 in the radial direction. That is, the rotating electrical machine 101 is configured as an inner rotor-type rotating electrical machine. In the rotating electrical machine 101, the stator 102 has coils (not shown) mounted therein, so that the rotor 100 makes a rotary motion by the interaction between the magnetic field (magnetic flux) generated by the coils and the magnetic field (magnetic flux) generated by the rotor 100 facing the stator 102. As shown in FIG. 1, the rotor 100 includes permanent magnets 1, a hub member 2, a rotor core 3, an adhesive 4, and end plates 5. The rotor 100 is fixed to the hub member 2 connected to a shaft 2a, so that the rotor 100 transmits its rotary motion to (or receives a rotary motion from) the outside of the rotating electrical machine 101 via the hub member 2 and the shaft 2a. The stator 102 is fixed to a case, not shown, for the rotating electrical machine 101.

For example, the permanent magnets 1 are neodymium magnets. Neodymium magnets have a positive coefficient of thermal expansion in the direction of magnetization (the direction of arrow R1 and the direction of arrow R2) and have a negative coefficient of thermal expansion in the direction perpendicular to the direction of magnetization (the lateral direction of the permanent magnet 1 and the direction along the Z-axis). The "lateral direction of the permanent magnet 1" refers to the direction perpendicular to the Z-axis and perpendicular to the direction of magnetization.

Figure 3:
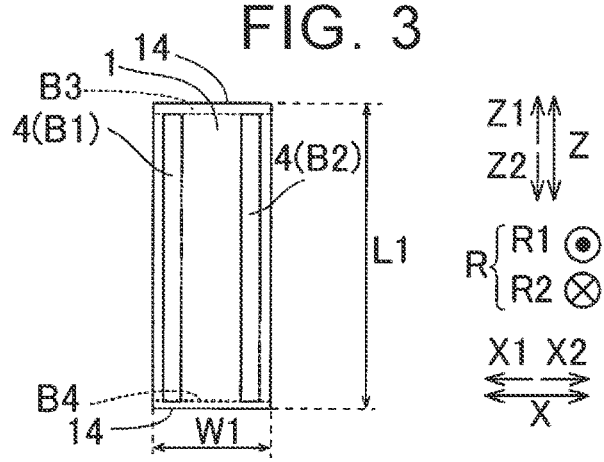
FIG. 3 is a side view showing the configuration of a permanent magnet and an adhesive for the rotor according to the embodiment.
Figure 4:
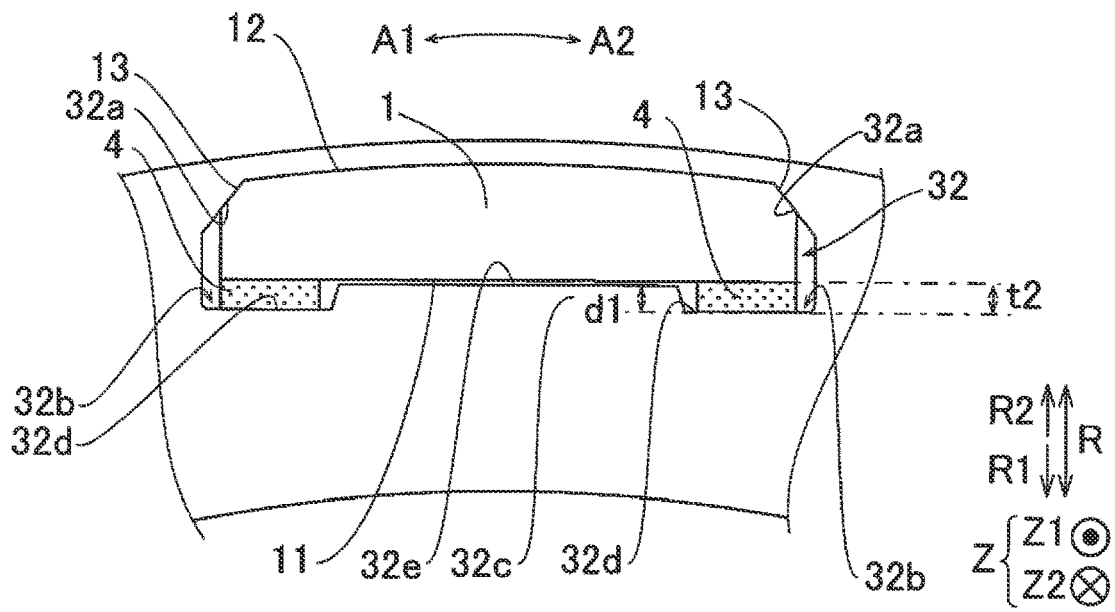
FIG. 4 is a partial plan view showing a permanent magnet and a rotor core of the rotor according to the embodiment being bonded with the adhesive.

As shown in FIG. 3, the permanent magnet 1 has a generally rectangular shape having an axial length L1 and a width W1 smaller than the length L1, as viewed from the radially inner side. As shown in FIG. 4, the permanent magnet 1 has a generally rectangular shape having two chamfered corners on the radially outer side, as viewed from one side in the axial direction (as viewed from the side in the direction of arrow Z1). The permanent magnet 1 is configured so that its radially inner surface 11 is a flat surface and its radially outer surface 12 is an arc-shaped surface, as viewed from the one side in the axial direction.

Each of the two chamfered corners of the permanent magnet 1 has a surface 13 serving as a contact surface that contacts a magnet hole 32 that is described later. The two surfaces 13 of the permanent magnet 1 are located so as to contact (surface-contact) wall surfaces 32a of the magnet hole 32. That is, the permanent magnet 1 is positioned by the pair of tapered wall surfaces 32a and is fixed in the positioned state, as viewed from the side in the direction of arrow Z1.

As shown in FIG. 1, the hub member 2 is engaged with an engagement portion 3a (see FIG. 2) of the rotor core 3 disposed on the side in the direction of arrow R2 with respect to the hub member 2 and is thus fixed to the rotor core 3. The hub member 2 is also fixed to the shaft 2a. The hub member 2, the rotor core 3, and the shaft 2a are configured to rotate together about the axis C1.

Figure 2:
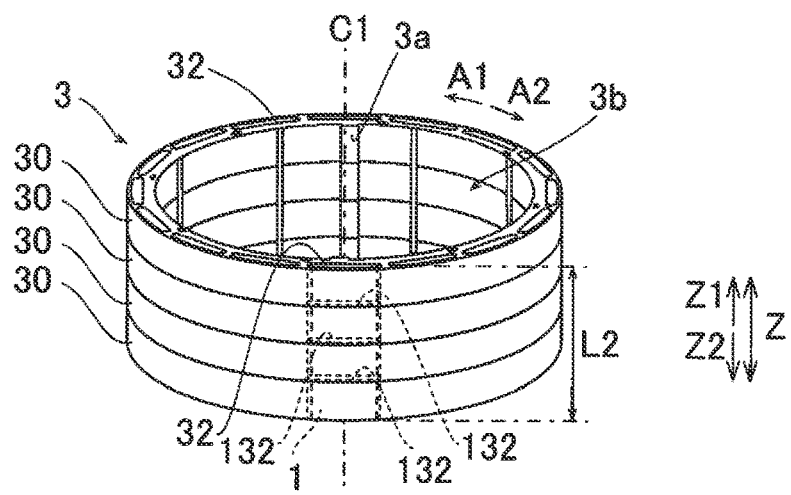
FIG. 2 is a perspective view of the rotor according to the embodiment.

As shown in FIG. 2, the rotor core 3 includes a plurality of (e.g., four) annular core blocks 30. The plurality of core blocks 30 are stacked in the axial direction such that their central axes are aligned with the axis C1. Each core block 30 is formed by stacking a plurality of annular electrical steel sheets 31 (see FIG. 1; e.g., silicon steel sheets) in the axial direction.

As shown in FIG. 2, each core block 30 has a plurality of (e.g., 16) holes 132 that are through holes extending in the axial direction. The plurality of core blocks 30 are stacked in the axial direction such that the holes 132 overlap (or are perfectly aligned with) each other as viewed from the side in the direction of arrow Z1. The holes 132 of the plurality of core blocks 30 are thus connected together to form the magnet holes 32 in the rotor core 3 in which the permanent magnets 1 are inserted in the axial direction. As shown in FIG. 2, the plurality of magnet holes 32 are formed at regular angular intervals on a circumference as viewed from the side in the direction of arrow Z1.

The plurality of magnet holes 32 have the permanent magnets 1 disposed therein. As shown in FIG. 1, the permanent magnet 1 is fixed in the magnet hole 32 with the adhesive 4. As shown in FIG. 2, the axial length L2 of the magnet hole 32 is slightly smaller than the axial length L1 of the permanent magnet 1. It is preferable that the permanent magnets 1 be unmagnetized.

As shown in FIG. 4, the magnet hole 32 has two grooves 32b in which the adhesive 4 is placed, and the grooves 32b are recessed toward the radially inner side of the rotor core 3 and extend in the axial direction. Specifically, the two grooves 32b are located at positions facing adhesive placement positions B1, B2, described later, of the surface 11 of the permanent magnet 1 in the radial direction. The two grooves 32b are formed near both ends in the circumferential direction of the magnet hole 32, and a protruding portion 32c is formed between the two grooves 32b. Each of the two grooves 32b has a bottom 32d, and the groove depth d1 from a top surface 32e of the protruding portion 32c to the bottom 32d is larger than a thickness t1 (see FIG. 7), described below, and is equal to or smaller than a thickness t2, described below.

Each protruding portion 32c of the rotor core 3 is formed in the middle part in the circumferential direction of the magnet hole 32 so as to protrude from the radially inner side toward the radially outer side of the magnet hole 32. Magnetic saturation is typically more likely to occur in both ends in the circumferential direction of the magnet hole 32 than in the middle part in the circumferential direction of the magnet hole 32. The protruding portion 32c is therefore formed at a position corresponding to the middle part in the circumferential direction of the magnet hole 32. Magnetic resistance can thus be reduced as compared to the case where no protruding portion 32c is formed and the case where the protruding portion 32c is formed at positions corresponding to both ends in the circumferential direction of the magnet hole 32. As a result, magnetic resistance can be reduced at a position where magnetic saturation is relatively less likely to occur.

As shown in FIG. 3, the adhesive 4 is placed on a part of the radially inner surface 11 of the permanent magnet 1. Specifically, the adhesive 4 is placed only on the adhesive placement positions B1, B2 of the surface 11 of the permanent magnet 1.

Specifically, the adhesive 4 is placed on two parts of the surface 11 of the permanent magnet 1, namely on the adhesive placement position B1 that is a part on one side in the lateral direction (the side in the direction of arrow X1) of the surface 11 and the adhesive placement position B2 that is a part on the other side in the lateral direction (the side in the direction of arrow X2) of the surface 11. The adhesive 4 is formed in a rectangular shape extending in the longitudinal direction of the surface 11 of the permanent magnet 1 (in the axial direction from the side in the direction of arrow Z1 to the side in the direction of arrow Z2). The adhesive 4 is not placed on axial end faces 14 of the permanent magnet 1 and a part B3 (a part on the side in the direction of arrow Z1) and a part B4 (a part on the side in the direction of arrow Z2) which are located near the axial end faces 14 of the surface 11 of the permanent magnet 1.

In the case where the adhesive 4 is placed on the radially outer surface 12 of the permanent magnet 1, the adhesive 4 is placed between the permanent magnet 1 and the stator 102 disposed radially outside the rotor core 3, and the distance between the permanent magnet 1 and the stator 102 is increased by an amount corresponding to the thickness t2 of the adhesive 4. On the other hand, in the present embodiment, no adhesive 4 is placed between the permanent magnet 1 and the stator 102, and the distance between the permanent magnet 1 and the stator 102 can be reduced accordingly.

In the state where the permanent magnet 1 has been fixed (bonded) to the rotor core 3 with the adhesive 4 (FIG. 5B), the adhesive 4 contains a foaming agent 41 that has foamed and a base resin 42 and a curing agent 43 which have been cured. The foaming agent 41 is an example of the "expanding agent."

The foaming agent 41 is an expanding agent that foams (expands) when heated to a temperature equal to or higher than an expansion start temperature T1. The base resin 42 and the curing agent 43 have the property of curing when heated to a temperature equal to or higher than a curing temperature T2 that is higher than the expansion start temperature T1.

Specifically, the foaming agent 41 is in the form of capsules (see FIG. 6), and when heated to a temperature equal to or higher than the expansion start temperature T1, the capsules expand and increase in volume. For example, the adhesive 4 contains isopentane (hydrocarbon) contained in the capsules as the foaming agent 41. For example, the expansion start temperature T1 can be set to a foaming temperature at which the capsules foam.

Figure 5A:
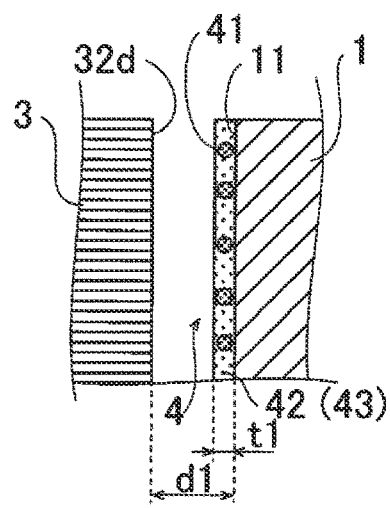
FIGS. 5A and 5B show sectional views schematically illustrating the state before expansion of the adhesive for the rotor according to the embodiment (FIG. 5A) and the state after expansion of the adhesive (FIG. 5B).
Figure 5B:
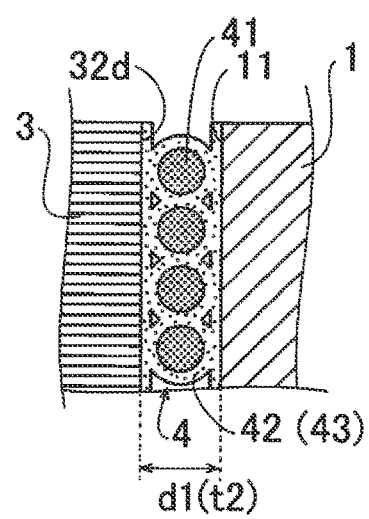
Figure 6:
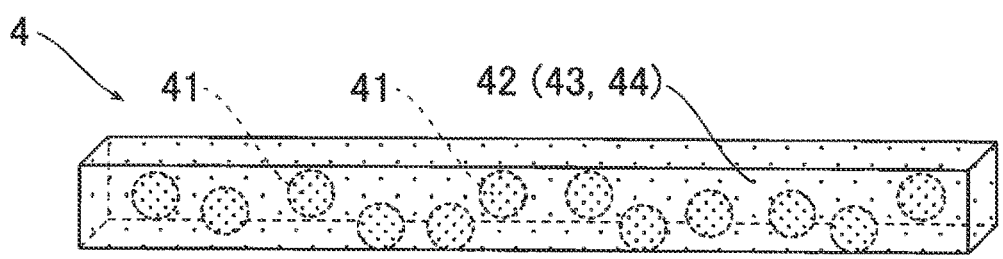
FIG. 6 is a conceptual diagram showing the configuration of the adhesive for the rotor according to the embodiment.

As shown in FIG. 5, as the foaming agent 41 foams and expands, the thickness of the adhesive 4 changes from the thickness t1 to the thickness t2. The adhesive 4 is thus placed so as to extend from the surface 11 of the permanent magnet 1 to the bottom 32d of the groove 32b. Even after heating, the foaming agent 41 remains in the adhesive 4 (in the magnet hole 32) as expanded capsules.

Figure 7:
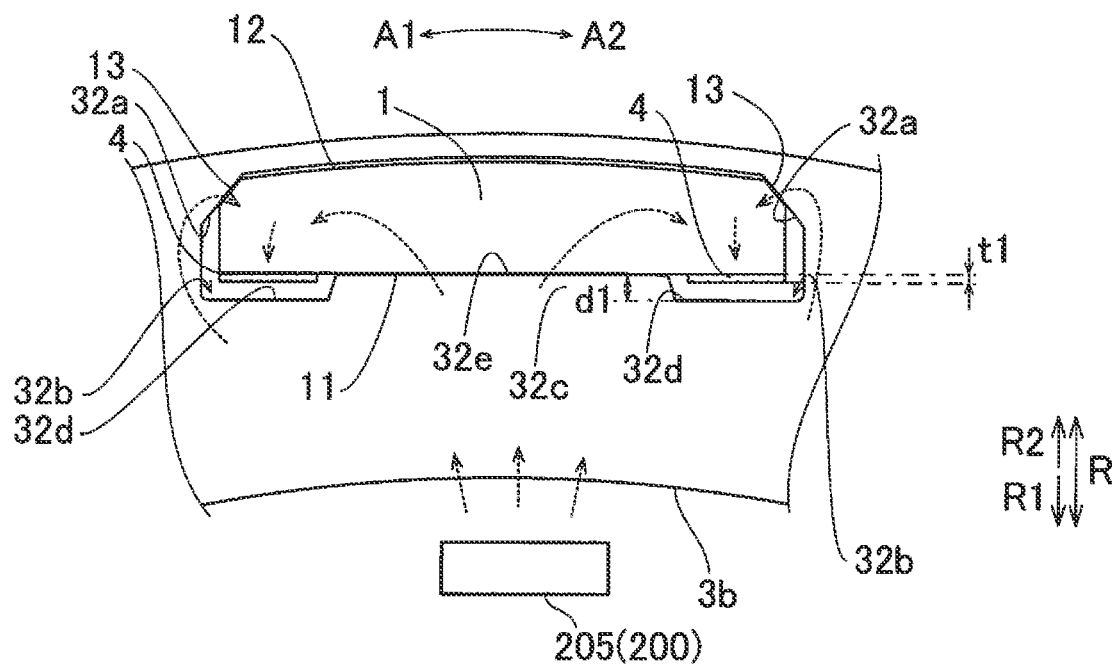
FIG. 7 is a partial plan view showing the rotor core of the rotor according to the embodiment having a permanent magnet inserted therein.

Preferably, the content of the foaming agent 41 in the adhesive 4 is set so that, as the foaming agent 41 foams and expands, the thickness of the adhesive 4 changes to the thickness t2 that is three times or more and eight times or less the thickness t1 of the adhesive 4 before expansion. As shown in FIG. 7, before foaming of the foaming agent 41 of the adhesive 4, the adhesive 4 is located away from the bottoms 32d of the grooves 32b, and the surfaces 13 of the permanent magnet 1 are located away from the wall surfaces 32a of the magnet hole 32. After foaming of the foaming agent 41 of the adhesive 4 (see FIG. 4), the adhesive 4 is in contact with the bottoms 32d of the grooves 32b as a result of its expansion and the permanent magnet 1 is being pressed radially outward to such a position that the surfaces 13 of the permanent magnet 1 contact the wall surfaces 32a of the magnet hole 32.

The base resin 42 contains, e.g., an epoxy resin (e.g., bisphenol-A liquid epoxy and epoxy resin polymer). The curing agent 43 contains, e.g., dicyandiamide. The base resin 42 and the curing agent 43 have the property of curing when heated to a temperature equal to or higher than the curing temperature (minimum curing temperature) T2. That is, in the present embodiment, the adhesive 4 is a thermosetting adhesive. The permanent magnet 1 is bonded and fixed to the rotor core 3 as the base resin 42 and the curing agent 43 of the adhesive 4 are cured. The curing temperature T2 is higher than a vaporization start temperature T3 described later and is higher than the expansion start temperature T1. The curing temperature T2 is set according to the combination of the base resin 42 and the curing agent 43 and is lower than a maximum product temperature (maximum curing temperature) T5. For example, the maximum product temperature T5 can be set to a temperature that is not so high as to affect performance as the rotor 100.

Figure 8A:
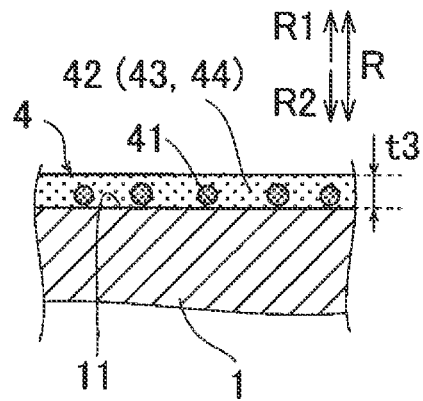
FIGS. 8A and 8B show partial sectional views schematically illustrating how the adhesive of the rotor according to the embodiment is dried (FIG. 8A shows the state before drying and FIG. 8B shows the state after drying).
Figure 8B:
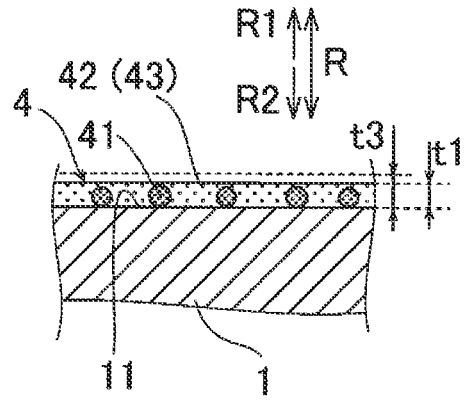

As shown in FIG. 8, in the state where the permanent magnet 1 has not been bonded to the rotor core 3 with the adhesive 4 and the adhesive 4 has not been dried, the adhesive 4 contains a volatile diluting solvent 44 serving as a volatile agent, the foaming agent 41 as an expanding agent that has not foamed, and the base resin 42 and the curing agent 43 which have not been cured.

In the state where the permanent magnet 1 has not been fixed to the rotor core 3 with the adhesive 4 and the adhesive 4 has been dried (see FIG. 8B), the adhesive 4 contains the foaming agent 41 and the base resin 42 and the curing agent 43 which have not been cured. That is, after the adhesive 4 is dried, the adhesive 4 contains either a reduced amount of diluting solvent 44 or substantially no diluting solvent 44.

Examples of the diluting solvent 44 include volatile organic solvents such as ketones like methyl ethyl ketone, alcohols, and ethers. In the present embodiment, the diluting solvent 44 contains both methyl ethyl ketone and ethyl acetate. The diluting solvent 44 has a lower viscosity than the foaming agent 41 and the curing agent 43. When contained in the adhesive 4, the diluting solvent 44 therefore serves to reduce viscosity of the adhesive 4 and to increase fluidity of the adhesive 4.

Figure 14:
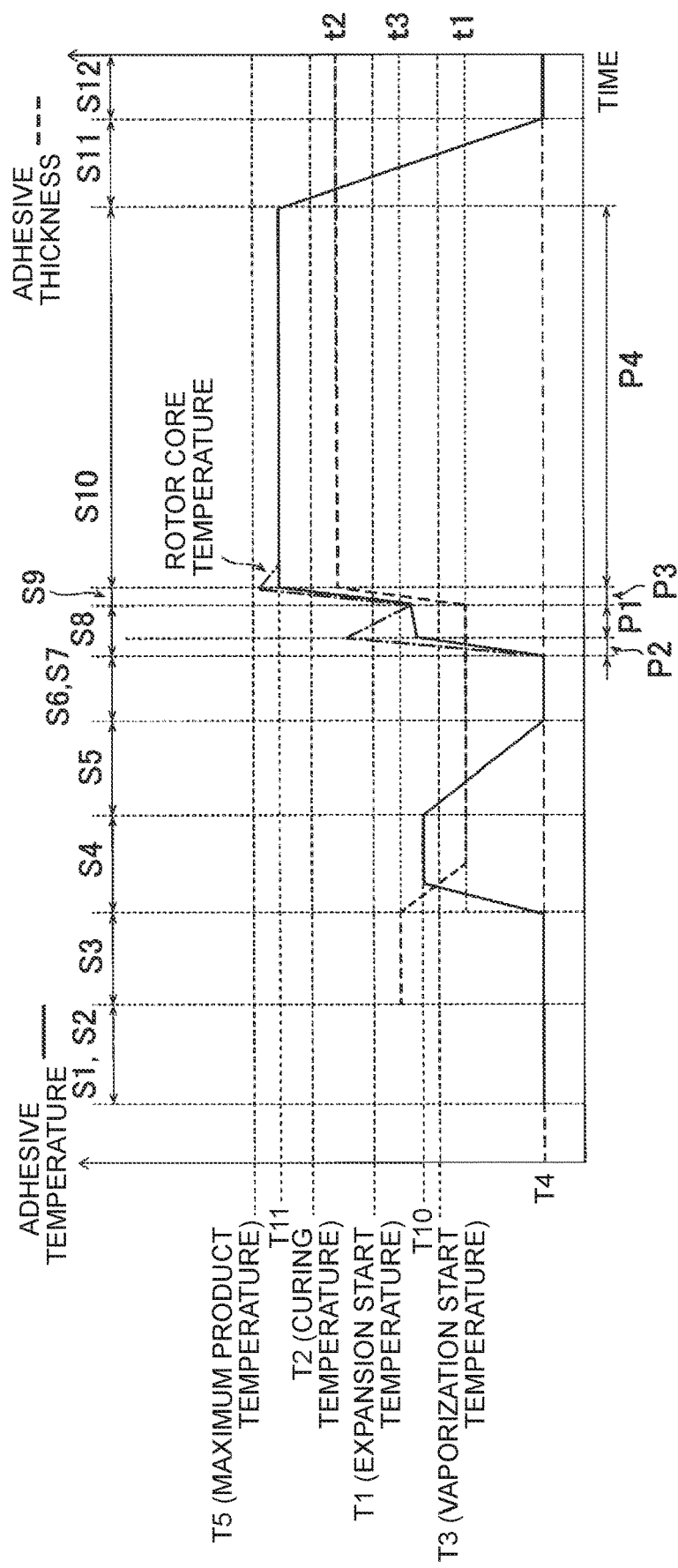
FIG. 14 is a diagram illustrating the thickness of the adhesive and the temperature of the adhesive during the process of manufacturing the rotor of the embodiment.

The diluting solvent 44 volatilizes when heated to a temperature equal to or higher than the vaporization start temperature T3 (e.g., a temperature T10 in FIG. 14). For example, the vaporization start temperature T3 can be set to the boiling point of the diluting solvent 44 or a temperature close to the boiling point of the diluting solvent 44.

The vaporization start temperature T3 is lower than the expansion start temperature T1. The expansion start temperature T1 is lower than the curing temperature T2. Accordingly, by heating the adhesive 4 to a temperature lower than the expansion start temperature T1 and equal to or higher than the vaporization start temperature T3, the diluting solvent 44 can be volatilized without causing expansion of the foaming agent 41. Even when heated to a temperature lower than the expansion start temperature T1 and equal to or higher than the vaporization start temperature T3, a part of the diluting solvent 44 may remain unvolatilized in the adhesive 4 due to an increase in viscosity of the adhesive 4 caused by volatilization of the diluting solvent 44.

As shown in FIG. 8, the adhesive 4 that has not been dried has a thickness t3 in the direction perpendicular to the lateral direction of the permanent magnet 1 (the direction of arrow R1 and the direction of arrow R2). As the diluting solvent 44 is volatilized, the adhesive 4 is reduced in volume and thickness. That is, the adhesive 4 that has been dried has the thickness t1 smaller than the thickness t3. Preferably, the thickness t1 is equal to or smaller than nine tenths (more preferably, equal to or smaller than four fifths) of the thickness t3.

[Method for Manufacturing a Rotor of Embodiment]

Figure 13:
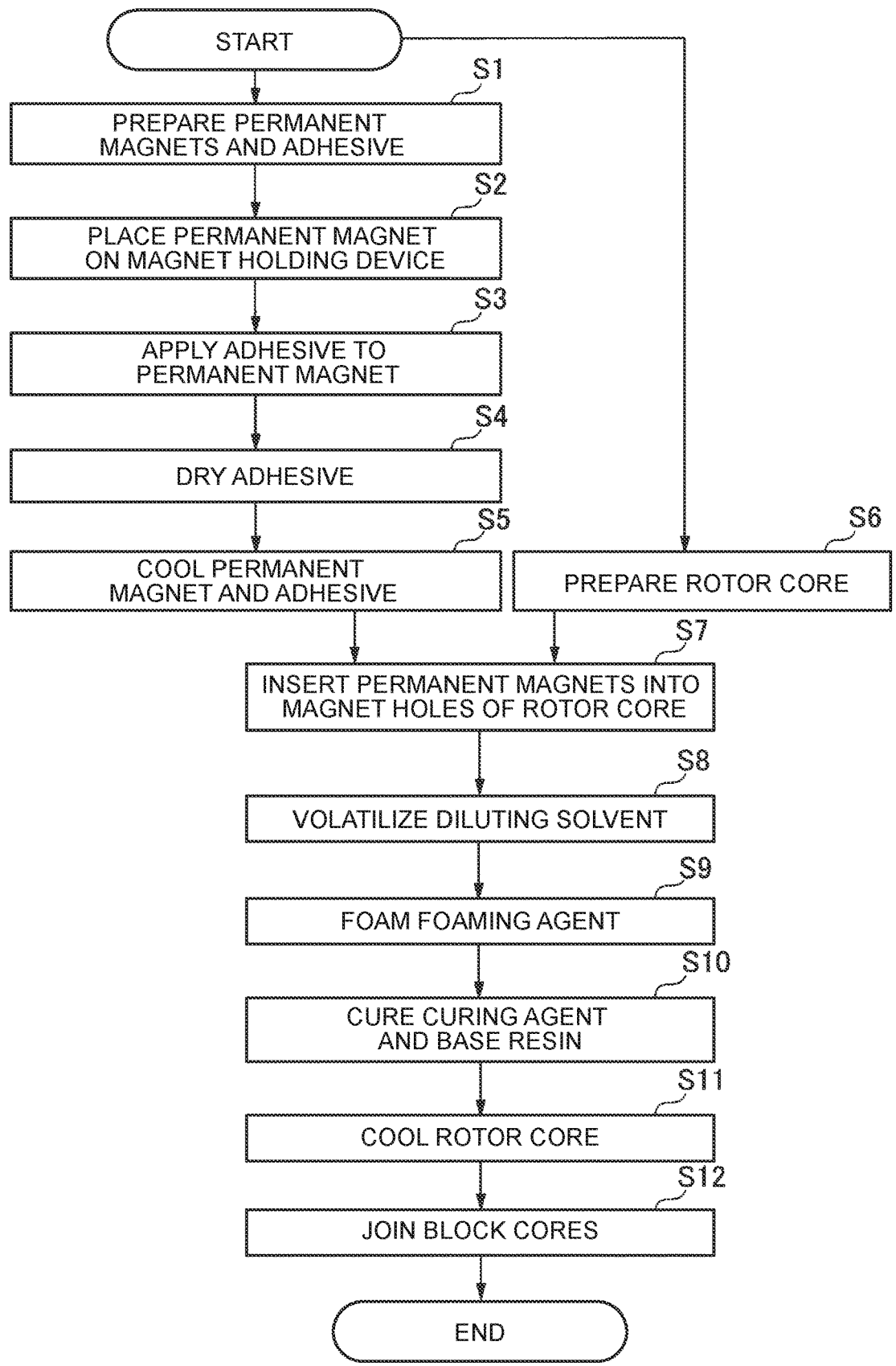
FIG. 13 is a flowchart illustrating a process of manufacturing the rotor of the embodiment.

Next, a method for manufacturing the rotor 100 according to the present embodiment will be described. FIG. 13 is a flowchart of the method for manufacturing the rotor 100 according to the present embodiment. FIG. 14 is a diagram illustrating the state of the adhesive 4 during the manufacturing process of the rotor 100, where the abscissa represents time and the ordinate represents the temperature of the adhesive 4 (left ordinate) and the thickness of the adhesive 4 (right ordinate).

Figure 9:
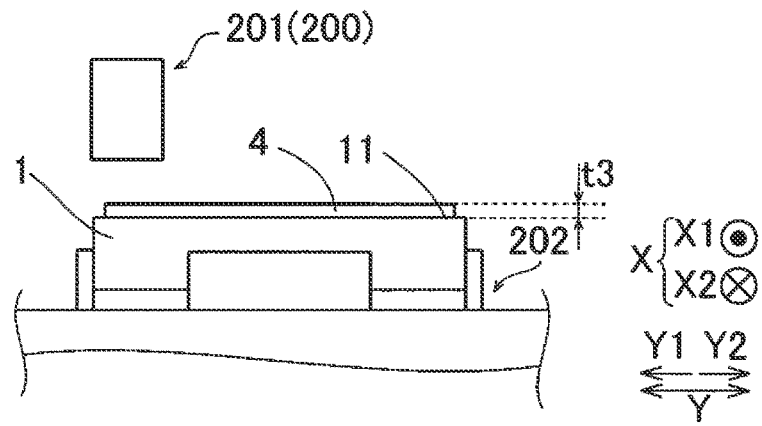
FIG. 9 is a diagram illustrating the step of applying the adhesive to a permanent magnet of the rotor according to the embodiment.

First, the step of preparing permanent magnets 1 and an adhesive 4 is performed in step S1. Specifically, a plurality of permanent magnets 1 including neodymium magnets are prepared. An adhesive 4 is also prepared. The adhesive 4 contains a foaming agent 41 as an expanding agent that expands when heated to a temperature equal to or higher the expansion start temperature T1, a volatile diluting solvent 44, and a base resin 42 and a curing agent 43 which cure when heated to a temperature equal to or higher than the curing temperature T2 that is higher than the expansion start temperature T1. The adhesive 4 is prepared in a melted state (fluid state). For example, the adhesive 4 may be in either a liquid state or a gel-like state. As shown in FIG. 9, the adhesive 4 thus prepared is placed in an application device 201 (applicator). The process then proceeds to step S2. It is preferable that the permanent magnets 1 be prepared unmagnetized. The application device 201 and an induction heating device 205 (heater) that is described later form a device 200 for manufacturing the rotor 100.

As shown in FIG. 9, the step of mounting the permanent magnet 1 on a magnet holding device 202 is performed in step S2. The process then proceeds to step S3.

The step of applying the adhesive 4 to the permanent magnet 1 and placing the adhesive 4 thereon is performed in step S3. Specifically, the application device 201 and the magnet holding device 202 are moved relative to each other while the adhesive 4 is being discharged from an opening at the tip end of a nozzle of the application device 201, whereby the adhesive 4 is applied to (placed on) the permanent magnet 1. The adhesive 4 with a thickness t3 is thus formed. For example, as shown in FIG. 3, the adhesive 4 is applied in the direction of the Y-axis to a part (adhesive placement position B1) on the side in the direction of arrow X1 of a surface 11 of the permanent magnet 1 and is then applied in the direction of the Y-axis to a part (adhesive placement position B2) on the side in the direction of arrow X2 of the surface 11 of the permanent magnet 1. At this time, the adhesive 4 is not applied to axial end faces 14 of the permanent magnet 1 and parts B3, B4 near the axial end faces 14. The adhesive 4 is applied to the permanent magnet 1 so as to have a rectangular shape as viewed in the direction of arrow Z1 and is thus placed on the permanent magnet 1. The process then proceeds to step S4.

Figure 10:
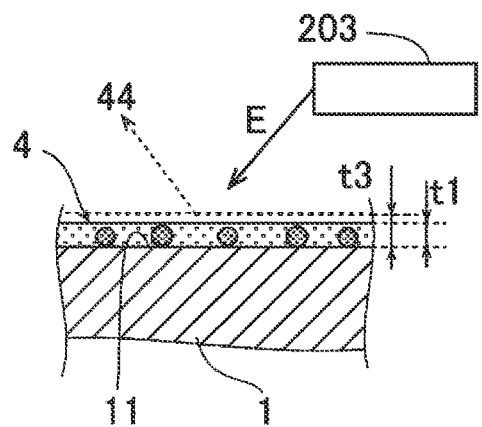
FIG. 10 is a diagram illustrating the step of drying the adhesive for the rotor according to the embodiment.

The step of drying the adhesive 4 is performed in step S4. The step of drying the adhesive 4 is performed before the step of inserting the permanent magnet 1 into a magnet hole 32 which will be described later. As shown in FIG. 10, by drying the adhesive 4, the thickness of the adhesive 4 is reduced to a thickness t1 smaller than the thickness t3 of the adhesive 4 before drying. The adhesive 4 is thus reduced in thickness.

Specifically, the adhesive 4 is dried by volatilizing the diluting solvent 44 contained in the adhesive 4. As shown in FIG. 14, by heating the adhesive 4 to the temperature T10 that is equal to or higher than the vaporization start temperature T3 and lower than the expansion start temperature T1, the adhesive 4 is dried and the thickness of the adhesive 4 is reduced from the thickness t3 to the thickness t1. Since the diluting solvent 44 with relatively low viscosity is volatilized, the viscosity of the adhesive 4 is improved and the adhesive 4 is positioned and fixed on the adhesive placement positions B1, B2. As described above, a part of the diluting solvent 44 may remain unvolatilized in the adhesive 4.

As shown in FIG. 10, for example, hot air E (air) having a temperature higher than room temperature T4 (the temperature T10 equal to or higher than the vaporization start temperature T3 and lower than the expansion start temperature T1) is blown from a drying device 203 onto the adhesive 4 to volatilize the diluting solvent 44 contained in the adhesive 4. The diluting solvent 44 thus volatilized by the hot air E is discharged by ventilation. The process then proceeds to step S5.

As shown in FIG. 14, the step of cooling the permanent magnet 1 and the adhesive 4 is performed in step S5. The permanent magnet 1 is thus contracted in the direction of magnetization (the radial direction of the rotor 100). For example, the permanent magnet 1 and the adhesive 4 are cooled to a temperature close to the room temperature T4. The process then proceeds to step S6.

The step of preparing a rotor core 3 is performed in step S6.

Figure 11:
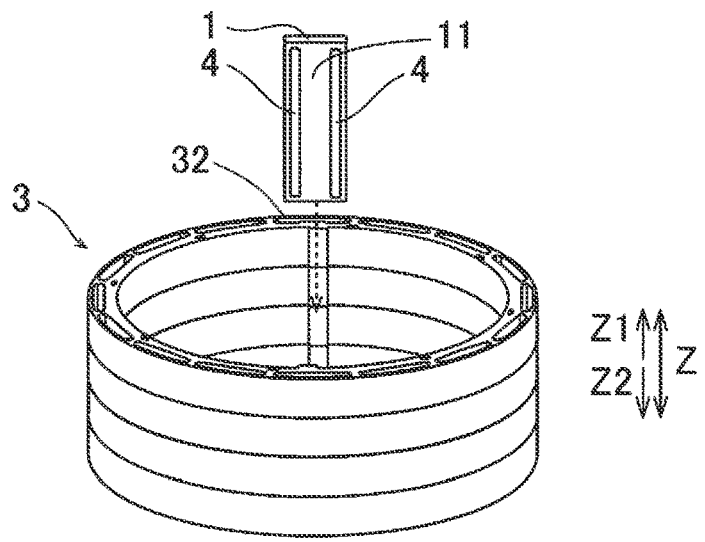
FIG. 11 is a perspective view illustrating the step of inserting a permanent magnet into the rotor core of the rotor according to the embodiment.

Specifically, a plurality of electrical steel sheets 31 are blanked out with a progressive press machine, not shown. A plurality of annular electrical steel sheets 31 each having holes 132 (see FIG. 2) with grooves 32b are formed at this time. As shown in FIG. 11, the plurality of electrical steel sheets 31 are stacked in the axial direction to form a plurality of (e.g., four) core blocks 30. The core blocks 30 are stacked in the axial direction. A part of the plurality of core blocks 30 is rotated or reversely rotated (rotationally stacked) in the circumferential direction relative to the remainder of the core blocks 30. The rotor core 3 is thus formed, and the holes 132 of the plurality of core blocks 30 are connected together in the axial direction, whereby magnet holes 32 are formed. The process then proceeds to step S7.

The step of inserting the permanent magnets 1 having the dried adhesive 4 placed thereon into the magnet holes 32 of the rotor core 3 is performed in step S7. Specifically, the rotor core 3 and the permanent magnet 1 whose surface 11 having the adhesive 4 placed thereon faces radially inward are moved relative to each other in the axial direction, whereby the permanent magnet 1 is inserted to each of the magnet holes 32. Although only one permanent magnet 1 is shown in FIG. 11, the permanent magnet 1 is inserted into each of the magnet holes 32.

In the present embodiment, after the step of inserting the permanent magnets 1 into the magnet holes 32, the step of volatilizing the diluting solvent 44 is performed in step S8 by heating the adhesive 4 to a temperature in a temperature range equal to or higher than the vaporization start temperature T3 at which the diluting solvent 44 volatilizes and lower than the expansion start temperature T1 and increasing the temperature of the adhesive 4 at a rate lower than that at which the temperature of the adhesive 4 is increased when the adhesive 4 is heated from a heating start temperature (room temperature T4) to a temperature in the temperature range equal to or higher than the vaporization start temperature T3 and lower than the expansion start temperature T1. Specifically, the diluting solvent 44 is volatilized by heating (rapidly heating) the adhesive 4 to a temperature equal to or higher than the vaporization start temperature T3 at which the diluting solvent 44 volatilizes and lower than the expansion start temperature T1 and keeping the adhesive 4 (keeping the temperature of the adhesive 4 constant) in the temperature range equal to or higher than the vaporization start temperature T3 and lower than the expansion start temperature T1. The induction heating device 205 heats the adhesive 4 to a temperature in a temperature range equal to or higher than the vaporization start temperature T3 at which the diluting solvent 44 volatilizes and lower than the expansion start temperature T1 and increases the temperature of the adhesive 4 with power lower than that with which the induction heating device 205 heats the adhesive 4 from the heating start temperature (room temperature T4) to a temperature in the temperature range equal to or higher than the vaporization start temperature T3 and lower than the expansion start temperature T1.

Figure 15A:
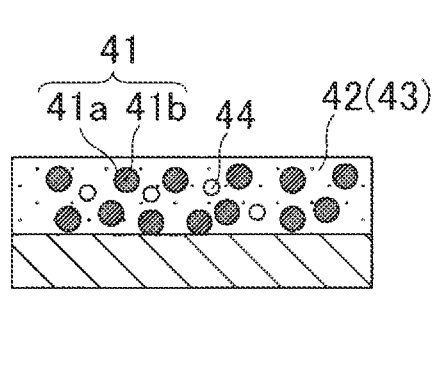
FIGS. 15A, 15B and 15C show diagrams illustrating the state where a foaming agent foams with a diluting solvent remaining in the adhesive (FIG. 15A shows the state where the diluting solvent remains in the adhesive, FIG. 15B shows the state where the diluting solvent has been vaporized, and FIG. 15C shows the case where no diluting solvent remains in the adhesive).
Figure 15B:
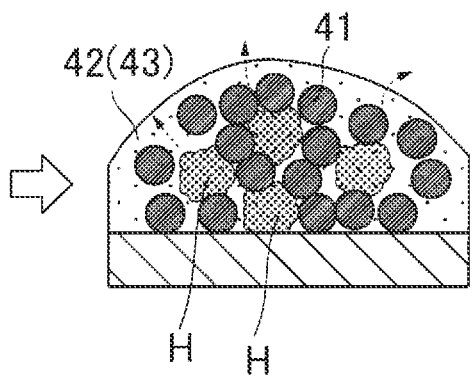
Figure 15C:
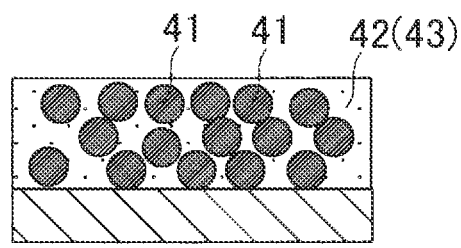

As shown in FIG. 15A, after the step of drying the adhesive 4, a part of the diluting solvent 44 remains unvolatilized due to an increase in viscosity of the adhesive 4. In this case, as shown in FIG. 15B, if the temperature of the adhesive 4 is rapidly increased, the foaming agent 41 foams while the diluting solvent 44 remaining in the adhesive 4 is vaporizing (boiling). The foaming agent 41 is formed by outer shell members 41a that are outer shells of thermoplastic resin and foaming agent portions 41b of hydrocarbon each covered by the outer shell member 41a. Accordingly, as the foaming agent portions 41b foam and the outer shell members 41a expand by heating, voids H are formed in the adhesive 4, causing overexpansion of the adhesive 4. The adhesive therefore has reduced density. FIG. 15C shows an example in which the foaming agent 41 has foamed with no diluting solvent 44 remaining in the adhesive 4 (an example in which overexpansion does not occur). After the step of inserting the permanent magnets 1 into the magnet holes 32 and before foaming of the foaming agent 41, the diluting solvent 44 remaining in the adhesive 4 is volatilized by heating the adhesive 4 to a temperature equal to or higher than the vaporization start temperature T3 at which the diluting solvent 44 volatilizes and lower than the expansion start temperature T1 and keeping the adhesive 4 in the temperature range equal to or higher than the vaporization start temperature T3 and lower than the expansion start temperature T1. The temperature of the adhesive 4 in the step of volatilizing the diluting solvent 44 is higher than that of the adhesive 4 in the step of drying the adhesive 4. The temperature of the adhesive 4 in the step of volatilizing the diluting solvent 44 is equal to or higher than the vaporization start temperature T3 and lower than the expansion start temperature T1 and includes a temperature at which the dried adhesive 4 starts dissolving.

In the present embodiment, as shown in FIG. 14, in the step of volatilizing the diluting solvent 44, the adhesive 4 applied to the permanent magnet 1 is heated (rapidly heated) to a temperature equal to or higher than the vaporization start temperature T3 at which the diluting solvent 44 volatilizes and lower than the expansion start temperature T1 during a second period P2 that is shorter than a first period P1 during which the adhesive 4 is kept in the temperature range equal to or higher than the vaporization start temperature T3 and lower than the expansion start temperature T1. For example, the first period P1 is a few minutes or longer and is not so long that the adhesive 4 is heated to the expansion start temperature T1. The second period P2 is about a few seconds to a few tens of seconds. That is, the temperature of the adhesive 4 is increased in a relatively short time (rapidly).

In the present embodiment, as shown in FIG. 7, the diluting solvent 44 is volatilized by heating the rotor core 3 by induction heating and thus heating (rapidly heating) the adhesive 4 to a temperature equal to or higher than the vaporization start temperature T3 at which the diluting solvent 44 volatilizes and lower than the expansion start temperature T1. Specifically, the rotor core 3 has on its radially inner side a shaft hole 3b in which a shaft 2a (or a hub member 2 to which the shaft 2a is connected) is mounted. The induction heating device 205 is placed on the radially inner side of the shaft hole 3b. The power of the induction heating device 205 (induction heating) is adjusted to heat the rotor core 3, whereby the adhesive 4 is heated (rapidly heated) to a temperature equal to or higher than the vaporization start temperature T3 at which the diluting solvent 44 volatilizes. The induction heating device 205 is an example of the "heating device."

In the present embodiment, as shown in FIG. 14 (see long dashed short dashed line), the rotor core 3 having the magnet holes 32 is heated to a temperature equal to or higher than the expansion start temperature T1. The adhesive 4 is heated to a temperature equal to or higher than the vaporization start temperature T3 at which the diluting solvent 44 volatilizes and lower than the expansion start temperature T1 and is kept in the temperature range equal to or higher than the vaporization start temperature T3 and lower than the expansion start temperature T1 by the heat of the heated rotor core 3. The diluting solvent 44 is thus volatilized.

Specifically, as shown in FIG. 7, heat (dotted arrows) from the induction heating device 205 is conducted through the rotor core 3 to the permanent magnet 1. Specifically, the heat from the induction heating device 205 is conducted through the wall surfaces 32a of the magnet hole 32 to the permanent magnet 1 and is also conducted through the protruding portion 32c of the magnet hole 32 to the permanent magnet 1. The heat is then conducted from the permanent magnet 1 to the adhesive 4. The heat is also conducted from the rotor core 3 to the adhesive 4 through air (air in the clearance between the rotor core 3 and the adhesive 4). The temperature of the permanent magnet 1 and the temperature of the adhesive 4 are substantially the same.

After the step of volatilizing the diluting solvent 44, the step of heating the adhesive 4 to a temperature equal to or higher than the expansion start temperature T1 to expand (foam) the foaming agent 41 is performed in step S9. In the present embodiment, the foaming agent 41 is expanded (foamed) by heating (rapidly heating) the adhesive 4 to a temperature equal to or higher than the expansion start temperature T1 during a third period P3 that is shorter than the first period P1 during which the adhesive 4 is kept in the temperature range equal to or higher than the vaporization start temperature T3 and lower than the expansion start temperature T1 in the step of volatilizing the diluting solvent 44. For example, the third period P3 is about a few seconds to a few tens of seconds. That is, the temperature of the adhesive 4 is increased and the foaming agent 41 is expanded (foamed) in a relatively short time (rapidly). Since the diluting solvent 44 remaining in the adhesive 4 has been volatilized in step S8, overexpansion of the adhesive 4 is restrained even if the foaming agent 41 is rapidly expanded (foamed) in step S9 (see FIG. 15C). After the step of volatilizing the diluting solvent 44, the foaming agent 41 is expanded by heating the adhesive 4 to a temperature equal to or higher than the expansion start temperature T1 so that the temperature of the adhesive 4 does not drop to a temperature equal to or lower than the vaporization start temperature T3.

Figure 12:
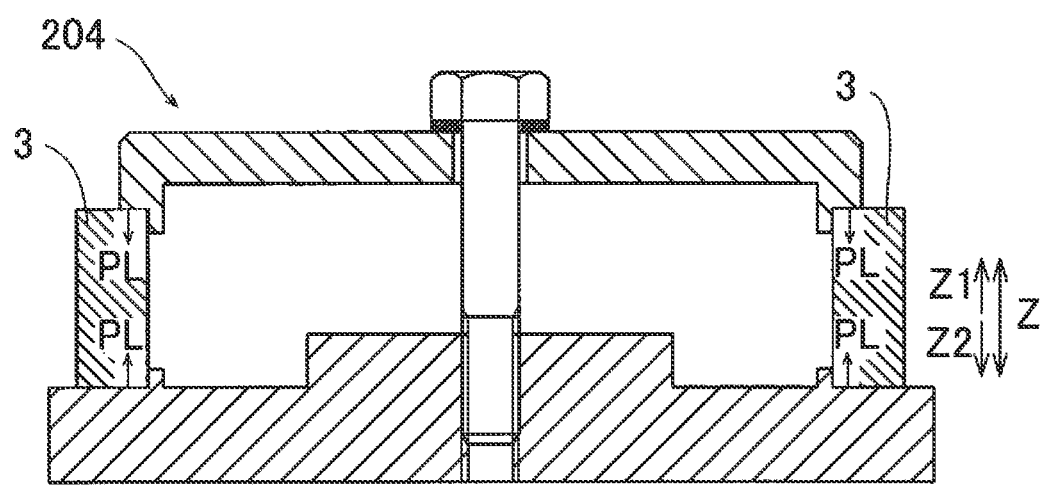
FIG. 12 is a sectional view illustrating the step of curing the adhesive for the rotor according to the embodiment.

Specifically, as shown in FIG. 12, the rotor core 3 with the permanent magnets 1 placed therein (and the permanent magnets 1) is pressed from both of the side in the direction of arrow Z1 and the side in the direction of arrow Z2 (reference characters PL) by a pressing device 204. In this state, the adhesive 4 is heated to a temperature T11 higher than the expansion start temperature T1 and equal to or higher than the curing temperature T2 (see FIG. 14). For example, the power of the induction heating device 205 is adjusted to heat the adhesive 4 to the temperature T11 higher than the expansion start temperature T1 and equal to or higher than the curing temperature T2 (see FIG. 14).

As shown in FIG. 5, as the foaming agent 41 of the adhesive 4 foams, the thickness of the adhesive 4 changes from the thickness t1 to the thickness t2. The thickness t2 of the adhesive 4 is substantially equal to the distance from the surface 11 of the permanent magnet 1 to the bottom 32d of the groove 32b. That is, the adhesive 4 is expanded so as to extend from the surface 11 of the permanent magnet 1 to the bottom 32d of the groove 32b. Moreover, as the adhesive 4 is expanded, the surfaces 13 of the permanent magnet 1 are pressed radially outward by the adhesive 4 and are brought into contact with the wall surfaces 32a of the magnet hole 32.

After the foaming agent 41 is expanded, the adhesive 4 is heated to a temperature equal to or higher than the curing temperature T2 to cure the adhesive 4, thereby fixing the permanent magnet 1 to the rotor core 3 with the adhesive 4 in step S10. In the present embodiment, the adhesive 4 is kept at a temperature equal to or higher than the curing temperature T2 during a fourth period P4 to be cured, so that the permanent magnet 1 is fixed to the rotor core 3 with the adhesive 4. Specifically, the adhesive 4 is kept at the temperature T11 higher than the expansion start temperature T1 and equal to or higher than the curing temperature T2 (see FIG. 14). The second period P2 (e.g., a few minutes) during which the adhesive 4 is heated to a temperature equal to or higher than the vaporization start temperature T3 at which the diluting solvent 44 volatilizes is shorter than the fourth period P4. For example, the fourth period P4 is a few tens of minutes. After the foaming agent 41 is expanded, the adhesive 4 is cured by heating the adhesive 4 to a temperature equal to or higher than the curing temperature T2 so that the temperature of the adhesive 4 does not drop to a temperature equal to or lower than the expansion start temperature T1. The permanent magnet 1 is thus fixed to the rotor core 3 with the adhesive 4. For example, the power of the induction heating device 205 is adjusted to heat the adhesive 4 to a temperature equal to or higher than the curing temperature T2.

As shown in FIG. 14, the step of cooling the rotor core 3 is then performed in step S11. For example, the rotor core 3 is cooled until the temperature of the rotor core 3 and the adhesive 4 becomes equal to room temperature T4. The process then proceeds to step S12.

The step of joining the plurality of core blocks 30 by laser welding etc. is performed in step S12.

The rotor 100 is manufactured in this manner. The rotor 100 is then put together with the stator 102, etc. as shown in FIG. 1. A rotating electrical machine 101 is thus manufactured.

Effects of Embodiment

The present embodiment has the following effects.

In the present embodiment, as described above, the method for manufacturing a rotor includes the step of volatilizing a diluting solvent (44) by heating an adhesive (4) to a temperature in a temperature range equal to or higher than a vaporization start temperature (T3) at which the diluting solvent (44) volatilizes and lower than an expansion start temperature (T1) and increasing the temperature of the adhesive (4) at a rate lower than that at which the temperature of the adhesive (4) is increased when the adhesive (4) is heated from a heating start temperature (T4) to a temperature in the temperature range equal to or higher than the vaporization start temperature (T3) and lower than the expansion start temperature (T1). Accordingly, even if the unvolatilized diluting solvent (44) remains in the adhesive (4) at the time the permanent magnet (1) is inserted into a magnet hole (32), the diluting solvent (44) remaining in the adhesive (4) can be volatilized because the temperature of the adhesive (4) is increased (kept) at a rate lower than that at which the temperature of the adhesive (4) is increased when the adhesive (4) is heated from the heating start temperature (T4) to a temperature in the temperature range equal to or higher than the vaporization start temperature (T3) and lower than the expansion start temperature (T1). Since the adhesive (4) is heated to (kept at) a temperature equal to or higher than the vaporization start temperature (T3) at which the diluting solvent (44) volatilizes and lower than the expansion start temperature (T1), an expanding agent (41) is not expanded in the step of volatilizing the diluting solvent (44). As a result, in the step of expanding the expanding agent (41) after the step of volatilizing the diluting solvent (44), the expanding agent (41) can be expanded with no diluting solvent (44) remaining in the adhesive (4). Overexpansion of the adhesive (4) due to vaporization of the diluting agent (44) can thus be restrained even if the temperature of the adhesive (4) is rapidly increased to a temperature equal to or higher than the expansion start temperature (T1). Accordingly, reduction in adhesive strength of the adhesive (4) can be prevented while reducing the time for which the temperature of the adhesive (4) is increased and thus reducing the time required to perform the bonding process.

In the present embodiment, as described above, the adhesive (4) is thermosetting and a curing temperature (T2) of the adhesive (4) is higher than the expansion start temperature (T1). With this configuration, the time required to perform the bonding process using the adhesive (4) comprised of a thermosetting resin containing the expanding agent (41) can be reduced.

In the present embodiment, as described above, after the expanding agent (41) is expanded, the adhesive (4) is cured by heating the adhesive (4) to a temperature equal to or higher than the curing temperature (T2) so that the temperature of the adhesive (4) does not drop to a temperature equal to or lower than the expansion start temperature (T1). With this configuration, the temperature of the adhesive (4) needs to be increased only to a small extent when the adhesive (4) is heated to the curing temperature (T2). The time required to perform the step of curing the adhesive (4) can therefore be reduced. Moreover, since volumetric shrinkage of the adhesive (4) after expansion can be restrained, the volume of the adhesive (4) after curing can be stabilized.

In the present embodiment, as described above, after the step of volatilizing the diluting solvent (44), the expanding agent (41) is expanded by heating the adhesive (4) to a temperature equal to or higher than the expansion start temperature (T1) so that the temperature of the adhesive (4) does not drop to a temperature equal to or lower than the vaporization start temperature (T3). With this configuration, the temperature of the adhesive (4) needs to be increased only to a small extent when the adhesive (4) is heated to the expansion start temperature (T1) or higher. The time required to perform the step of expanding the expanding agent (41) can therefore be reduced.

In the present embodiment, as described above, the step of volatilizing the diluting solvent (44) is a step of volatilizing the diluting solvent (44) that remains in the adhesive (4) without being volatilized in the step of drying the adhesive (4). In the step of drying the adhesive (4), a part of the diluting solvent (44) contained in the adhesive (4) is volatilized. However, the viscosity of the adhesive (4) gradually increases as the diluting solvent (44) volatilizes. The diluting solvent (44) not able to be volatilized therefore remains in the adhesive (4). Accordingly, including the step of volatilizing the diluting solvent (44) that remains in the adhesive (4) without being volatilized in the step of drying the adhesive (4) is particularly effective in volatilizing the remaining diluting solvent (44) in the method for manufacturing the rotor (100) which includes the step of drying the adhesive (4).

In the present embodiment, as described above, the temperature of the adhesive (4) in the step of volatilizing the diluting solvent (44) is higher than that of the adhesive (4) in the step of drying the adhesive (4). With this configuration, the time required to volatilize the diluting solvent (44) can be reduced, and the diluting solvent (44) can be reliably volatilized before the permanent magnet (1) is fixed to a rotor core (3) with the adhesive (4).

In the present embodiment, as described above, the temperature of the adhesive (4) in the step of volatilizing the diluting solvent (44) is equal to or higher than the vaporization start temperature (T3) and lower than the expansion start temperature (T1) and includes a temperature at which the dried adhesive (4) starts dissolving. With this configuration, since the adhesive (4) is in a melted state, the vaporized diluting solvent (44) can be reliably volatilized, and the time required to volatilize the diluting solvent (44) can further be reduced.

In the present embodiment, as described above, the step of volatilizing the diluting solvent (44) is a step of rapidly heating the adhesive (4) to a temperature equal to or higher than the vaporization start temperature (T3) at which the diluting solvent (44) volatilizes and lower than the expansion start temperature (T1) during a second period (P2) that is shorter than a first period (P1) during which the adhesive (4) is kept in the temperature range equal to or higher than the vaporization start temperature (T3) and lower than the expansion start temperature (T1). With this configuration, the adhesive (4) can be heated in a relatively short time (rapidly). The time required to manufacture the rotor (100) can therefore be reduced.

In the present embodiment, as described above, the step of expanding the expanding agent (41) is a step of expanding the expanding agent (41) by rapidly heating the adhesive (4) to a temperature equal to or higher than the expansion start temperature (T1) during a third period (P3) that is shorter than the first period (P1) during which the adhesive (4) is kept in the temperature range equal to or higher than the vaporization start temperature (T3) and lower than the expansion start temperature (T1) in the step of volatilizing the diluting solvent (44). With this configuration, the expanding agent (41) can be expanded in a relatively short time (rapidly). The time required to manufacture the rotor (100) can therefore further be reduced.

In the present embodiment, as described above, the second period (P2) during which the adhesive (4) is heated to a temperature equal to or higher than the vaporization start temperature (T3) at which the diluting solvent (44) volatilizes and lower than the expansion start temperature (T1) is shorter than a fourth period (P4). With this configuration, the diluting solvent (44) remaining in the adhesive (4) is volatilized in a relatively short time. The time required to manufacture the rotor (100) can therefore further be reduced.

In the present embodiment, as described above, the step of volatilizing the diluting solvent (44) is a step of volatilizing the diluting solvent (44) by heating the rotor core (3) having the magnet hole (32) to a temperature equal to or higher than the expansion start temperature (T1) and thus heating the adhesive (4) to a temperature equal to or higher than the vaporization start temperature (T3) at which the diluting solvent (44) volatilizes and lower than the expansion start temperature (T1) and keeping the adhesive (4) in the temperature range equal to or higher than the vaporization start temperature (T3) and lower than the expansion start temperature (T1). With this configuration, the adhesive (4) can be heated to a temperature equal to or higher than the vaporization start temperature (T3) at which the diluting solvent (44) volatilizes and lower than the expansion start temperature (T1) through the permanent magnet (1) by the heat of the rotor core (3) heated to a temperature equal to or higher than the expansion start temperature (T1) that is higher than the vaporization start temperature (T3).

In the present embodiment, as described above, the step of volatilizing the diluting solvent (44) is a step of rapidly heating the adhesive (4) to a temperature equal to or higher than the vaporization start temperature (T3) at which the diluting solvent (44) volatilizes and lower than the expansion start temperature (T1) by heating the rotor core (3) by induction heating. With this configuration, the adhesive (4) can be heated in a relatively short time (rapidly) by induction heating. The time required to manufacture the rotor (100) can therefore be effectively reduced.

In the present embodiment, as described above, the step of volatilizing the diluting solvent (44) is a step of rapidly heating the adhesive (4) to a temperature equal to or higher than the vaporization start temperature (T3) at which the diluting solvent (44) volatilizes and lower than the expansion start temperature (T1) by heating the rotor core (3) by an induction heating device (205) placed on a radially inner side of the rotor core (3) where a shaft hole (3b) is formed. With this configuration, the induction heating device (205) that performs induction heating can be placed in the shaft hole (3b) of the rotor core (3). The space required to manufacture the rotor (100) can thus be prevented from becoming larger than in the case where the induction heating device (205) is placed outside the rotor core (3).

In the present embodiment, as described above, a heating device (205) can volatilize the diluting solvent (44) remaining in the adhesive (4) by heating the adhesive (4) to a temperature in the temperature range equal to or higher than the vaporization start temperature (T3) at which the diluting solvent (44) volatilizes and lower than the expansion start temperature (T1) and increasing the temperature of the adhesive (4) with power lower than that with which the heating device (205) heats the adhesive (4) from the heating start temperature (T4) to a temperature in the temperature range equal to or higher than the vaporization start temperature (T3) and lower than the expansion start temperature (T1).

[Modifications]

For example, the above embodiment shows an example in which the rotor 100 is configured as what is called an inner rotor, namely the rotor 100 is disposed radially inside the stator 102. However, the present disclosure is not limited to this. That is, the rotor 100 may be configured as an outer rotor.

The above embodiment shows an example in which the foaming agent is used as an expanding agent. However, the present disclosure is not limited to this. For example, a material other than the foaming agent 41, which expands when heated, may be used as the expanding agent.

The above embodiment shows an example in which the curing temperature T2 is a temperature higher than the expansion start temperature T1. However, the present disclosure is not limited to this. For example, the curing temperature T2 may be a temperature equal to the expansion start temperature T1. The curing temperature T2 needs only to be equal to or higher than the expansion start temperature T1.

The above embodiment shows an example in which the adhesive 4 is applied to the permanent magnets 1. However, the present disclosure is not limited to this. For example, the adhesive 4 may be applied to the magnet holes 32. Even in the case where the adhesive 4 is applied to the magnet holes 32, a method for manufacturing the rotor 100 is similar to that in the above embodiment. That is, step S3 is replaced with the step of applying the adhesive 4 to the magnet hole 32, but the other steps are similar to those of the above embodiment.

The above embodiment shows an example in which the adhesive 4 is heated by induction heating in the step of volatilizing the diluting solvent 44. However, the present disclosure is not limited to this. For example, the adhesive 4 may be heated by a method other than induction heating in the step of volatilizing the diluting solvent 44.

The above embodiment shows an example in which the adhesive 4 is heated from the radially inner side of the rotor core 3 by induction heating. However, the present disclosure is not limited to this. For example, the adhesive 4 may be heated from the radially outer side of the rotor core 3 by induction heating (or by a method other than induction heating).

The invention claimed is:

1. A method for manufacturing a rotor including a rotor core and a permanent magnet, the rotor core having a magnet hole, and the permanent magnet being inserted in the magnet hole and fixed to the rotor core with an adhesive, comprising the steps of:

applying the adhesive, which contains a volatile diluting solvent serving as a volatile agent and an expanding agent that expands when heated to a temperature equal to or higher than an expansion start temperature, to the permanent magnet or the magnet hole;

inserting the permanent magnet into the magnet hole of the rotor core;

after the step of inserting the permanent magnet into the magnet hole, volatilizing the diluting solvent by heating the adhesive to a temperature in a temperature range equal to or higher than a vaporization start temperature at which the diluting solvent volatilizes and lower than the expansion start temperature and increasing the temperature of the adhesive at a rate lower than that at which the temperature of the adhesive is increased when the adhesive is heated from a heating start temperature to a temperature in the temperature range equal to or higher than the vaporization start temperature and lower than the expansion start temperature;

after the step of volatilizing the diluting solvent, expanding the expanding agent by heating the adhesive to a temperature equal to or higher than the expansion start temperature; and after expanding the expanding agent, fixing the permanent magnet to the rotor core with the adhesive by curing the adhesive by heating the adhesive to a temperature equal to or higher than a curing temperature.

2. The method for manufacturing a rotor according to claim 1, wherein the adhesive is thermosetting and the curing temperature of the adhesive is higher than the expansion start temperature.

3. The method for manufacturing a rotor according to claim 2, wherein the step of fixing the permanent magnet to the rotor core is a step of, after expanding the expanding agent, fixing the permanent magnet to the rotor core with the adhesive by curing the adhesive by heating the adhesive to a temperature equal to or higher than the curing temperature so that the temperature of the adhesive does not drop to a temperature equal to or lower than the expansion start temperature.

4. The method for manufacturing a rotor according to claim 3, wherein the step of expanding the expanding agent is a step of, after volatilizing the diluting solvent, expanding the expanding agent by heating the adhesive to a temperature equal to or higher than the expansion start temperature so that the temperature of the adhesive does not drop to a temperature equal to or lower than the vaporization start temperature.

5. The method for manufacturing a rotor according to claim 2, wherein the step of expanding the expanding agent is a step of, after volatilizing the diluting solvent, expanding the expanding agent by heating the adhesive to a temperature equal to or higher than the expansion start temperature so that the temperature of the adhesive does not drop to a temperature equal to or lower than the vaporization start temperature.

6. The method for manufacturing a rotor according to claim 2, further comprising the step of:

before the step of inserting the permanent magnet into the magnet hole, drying the adhesive applied to the permanent magnet or the magnet hole, wherein the step of volatilizing the diluting solvent is a step of volatilizing the diluting solvent that remains in the adhesive without being volatilized in the step of drying the adhesive.

7. The method for manufacturing a rotor according to claim 1, wherein
the step of fixing the permanent magnet to the rotor core is a step of, after expanding the expanding agent, fixing the permanent magnet to the rotor core with the adhesive by curing the adhesive by heating the adhesive to a temperature equal to or higher than the curing temperature so that the temperature of the adhesive does not drop to a temperature equal to or lower than the expansion start temperature.

8. The method for manufacturing a rotor according to claim 7, wherein
the step of expanding the expanding agent is a step of, after volatilizing the diluting solvent, expanding the expanding agent by heating the adhesive to a temperature equal to or higher than the expansion start temperature so that the temperature of the adhesive does not drop to a temperature equal to or lower than the vaporization start temperature.

9. The method for manufacturing a rotor according to claim 1, wherein
the step of expanding the expanding agent is a step of, after volatilizing the diluting solvent, expanding the expanding agent by heating the adhesive to a temperature equal to or higher than the expansion start temperature so that the temperature of the adhesive does not drop to a temperature equal to or lower than the vaporization start temperature.

10. The method for manufacturing a rotor according to claim 1, further comprising the step of:
before the step of inserting the permanent magnet into the magnet hole, drying the adhesive applied to the permanent magnet or the magnet hole, wherein
the step of volatilizing the diluting solvent is a step of volatilizing the diluting solvent that remains in the adhesive without being volatilized in the step of drying the adhesive.

11. The method for manufacturing a rotor according to claim 10, wherein
the temperature of the adhesive in the step of volatilizing the diluting solvent is higher than that of the adhesive in the step of drying the adhesive.

12. The method for manufacturing a rotor according to claim 10, wherein
the temperature of the adhesive in the step of volatilizing the diluting solvent is equal to or higher than the vaporization start temperature and lower than the expansion start temperature and includes a temperature at which the dried adhesive starts dissolving.

13. The method for manufacturing a rotor according to claim 12, wherein
the step of applying the adhesive is a step of applying the adhesive, which contains the diluting solvent and the expanding agent, to the permanent magnet, and
the step of volatilizing the diluting solvent is a step of volatilizing the diluting solvent by keeping the adhesive in the temperature range equal to or higher than the vaporization start temperature and lower than the expansion start temperature.

14. The method for manufacturing a rotor according to claim 13, wherein
the step of volatilizing the diluting solvent is a step of keeping the adhesive in the temperature range equal to or higher than the vaporization start temperature and lower than the expansion start temperature and rapidly heating the adhesive to a temperature equal to or higher than the vaporization start temperature at which the diluting solvent volatilizes and lower than the expansion start temperature during a second period that is shorter than a first period during which the adhesive is kept in the temperature range equal to or higher than the vaporization start temperature and lower than the expansion start temperature.

15. The method for manufacturing a rotor according to claim 14, wherein
the step of expanding the expanding agent is a step of expanding the expanding agent by rapidly heating the adhesive to a temperature equal to or higher than the expansion start temperature during a third period that is shorter than the first period during which the adhesive is kept in the temperature range equal to or higher than the vaporization start temperature and lower than the expansion start temperature in the step of volatilizing the diluting solvent.

16. The method for manufacturing a rotor according to claim 14, wherein
the step of fixing the permanent magnet to the rotor core with the adhesive is a step of fixing the permanent magnet to the rotor core with the adhesive by curing the adhesive by keeping the adhesive at a temperature equal to or higher than the curing temperature during a fourth period, and
the second period during which the adhesive is heated to a temperature equal to or higher than the vaporization start temperature at which the diluting solvent volatilizes and lower than the expansion start temperature is shorter than the fourth period.

17. The method for manufacturing a rotor according to claim 1, wherein
the step of volatilizing the diluting solvent is a step of rapidly heating the adhesive to a temperature equal to or higher than the vaporization start temperature at which the diluting solvent volatilizes and lower than the expansion start temperature by heating the rotor core by induction heating.

18. The method for manufacturing a rotor according to claim 17, wherein
the rotor core has on its radially inner side a shaft hole in which a shaft is mounted, and
the step of volatilizing the diluting solvent is a step of rapidly heating the adhesive to a temperature equal to or higher than the vaporization start temperature at which the diluting solvent volatilizes and lower than the expansion start temperature by heating the rotor core by an induction heater disposed on the radially inner side of the rotor core where the shaft hole is formed.

19. A device for manufacturing a rotor including a rotor core and a permanent magnet, the rotor core having a magnet hole, and the permanent magnet being inserted in the magnet hole and fixed to the rotor core with an adhesive, the device comprising:
an applicator that applies the adhesive, which contains a volatile diluting solvent serving as a volatile agent and an expanding agent that expands when heated to a temperature equal to or higher than an expansion start temperature, to the permanent magnet or the magnet hole; and
a heater that heats the adhesive, wherein the heater is configured to:

after the permanent magnet is inserted into the magnet hole of the rotor core, volatize the diluting solvent by heating the adhesive to a temperature in a temperature range equal to or higher than a vaporization start temperature at which the diluting solvent volatilizes and lower than the expansion start temperature and increasing the temperature of the adhesive with power lower than that with which the heater heats the adhesive from a heating start temperature to a temperature in the temperature range equal to or higher than the vaporization start temperature and lower than the expansion start temperature, after the diluting solvent is volatilized, heat the adhesive to a temperature equal to or higher than the expansion start temperature to expand the expanding agent, and after the expanding agent is expanded, heat the adhesive to a temperature equal to or higher than a curing temperature to cure the adhesive, thereby fixing the permanent magnet to the rotor core with the adhesive.

\* \* \* \* \*